US009558719B2

(12) United States Patent
Matsushima et al.

(10) Patent No.: US 9,558,719 B2
(45) Date of Patent: Jan. 31, 2017

(54) INFORMATION PROCESSING APPARATUS

(71) Applicant: CANON KABUSHIKI KAISHA, Tokyo (JP)

(72) Inventors: Naohiro Matsushima, Tokyo (JP); Toshiyuki Yasuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 13/713,504

(22) Filed: Dec. 13, 2012

(65) Prior Publication Data

US 2013/0162675 A1  Jun. 27, 2013

(30) Foreign Application Priority Data

Dec. 22, 2011  (JP) .................................. 2011-282264

(51) Int. Cl.
*H04N 13/02*  (2006.01)
*G09G 5/377*  (2006.01)

(52) U.S. Cl.
CPC .......... *G09G 5/377* (2013.01); *H04N 13/0239* (2013.01); *G09G 2340/12* (2013.01)

(58) Field of Classification Search
None
See application file for complete search history.

(56) References Cited

U.S. PATENT DOCUMENTS

| 3,959,580 | A | * | 5/1976 | Chocol et al. | .................. 348/42 |
| 6,177,952 | B1 | | 1/2001 | Tabata et al. | |
| 2006/0072206 | A1 | * | 4/2006 | Tsuyuki et al. | ............... 359/631 |
| 2010/0026787 | A1 | | 2/2010 | Yasuda et al. | |
| 2010/0091096 | A1 | * | 4/2010 | Oikawa et al. | .................. 348/53 |
| 2010/0321482 | A1 | * | 12/2010 | Cleveland | ............... G06F 3/012 348/78 |

FOREIGN PATENT DOCUMENTS

| JP | 2003-279882 A | 10/2003 |
| JP | 2005-115251 A | 4/2005 |
| JP | 2005-311754 A | 11/2005 |
| JP | 2006-108868 A | 4/2006 |
| JP | 2006-285609 A | 10/2006 |

OTHER PUBLICATIONS

Extended European Search Report in European Patent Appln. No. 12 19 8453, Apr. 3, 2013.

* cited by examiner

*Primary Examiner* — Mark Zimmerman
*Assistant Examiner* — Yu-Jang Tswei
(74) *Attorney, Agent, or Firm* — Fitzpatrick, Cella, Harper & Scinto

(57) ABSTRACT

An information processing apparatus comprising first and second display units for respectively displaying first and a second composite images for the two eyes of a user, comprising: a moving unit configured to move positions of the first and second display units; a detecting unit configured to detect moving amounts of the first and second display units; first and second image capturing units configured to respectively obtain first and second captured images; an extracting unit configured to generate first and second extracted images by respectively extracting portions of the first and second captured images in extraction ranges associated with the moving amounts; and a composite image generating unit configured to generate the first and second composite images by respectively compositing first and second CG images with the first and second extracted images.

18 Claims, 3 Drawing Sheets

F I G. 2
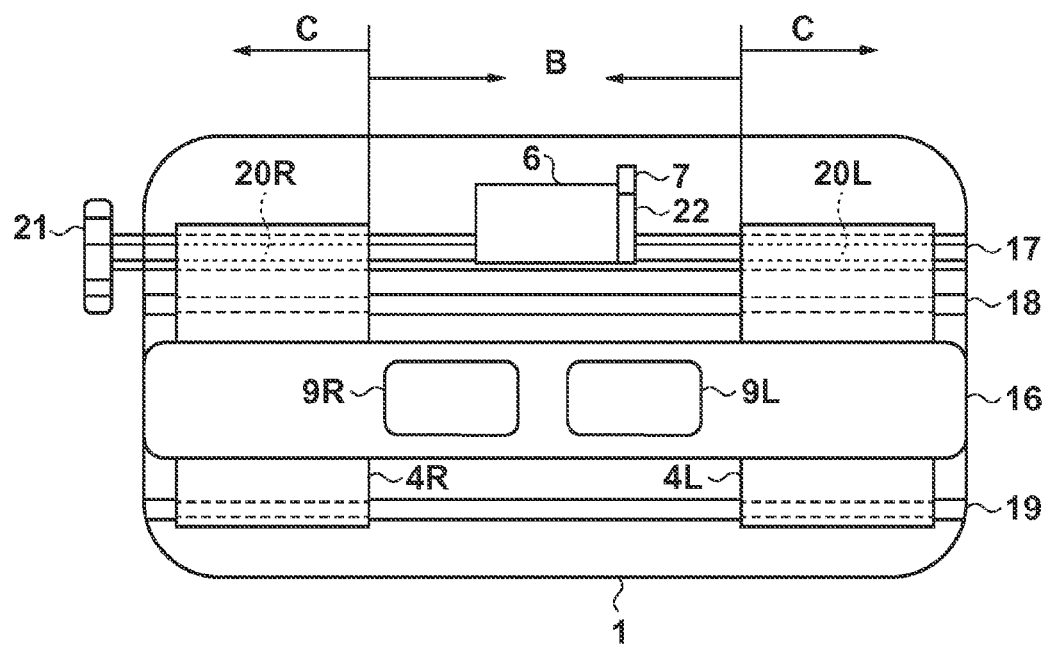

INFORMATION PROCESSING APPARATUS

BACKGROUND OF THE INVENTION

1. Field of the Invention

The present invention relates to an information processing apparatus and, more particularly, to an information processing apparatus including an image capturing system including at least two cameras for capturing an external image of the real world, and a display system for superposing a CG (Computer Graphics) image such as 3D-CAD data on the image captured by the image capturing system, and displaying the obtained image.

2. Description of the Related Art

The MR (Mixed Reality) technique can exhibit an object drawn by CG or the like as if the object existed in the real world. The MR technique is implemented by superposing a CG image of a virtual world generated by CG on a captured image of the real world, and displaying a composite image. A video see-through type HMD (Head Mounted Display) is known as an image display apparatus for implementing the MR technique.

The video see-through type HMD includes an image capturing system for capturing an external image of the real world, a CG image generator for generating a CG image of a virtual world as if the image were seen from an image capturing position in the real world, a composite image generator for generating a composite image by compositing the external image and CG image, and a display system for displaying the composite image.

The image capturing system captures an external image of the real world in a state in which the image capturing direction is almost matched with the line of sight from the pupil position of the user, thereby obtaining a captured image. Note that in the image capturing system, right and left cameras are arranged such that their optical axes are almost parallel. A human observes an object by rotating the right and left eyes inward so that the optical axes of the two eyes intersect at the object. This rotating motion of the eye is called convergence (congestion). A captured image obtained by the image capturing system has no convergence, because the optical axes of the right and left cameras are almost parallel. To obtain a natural image by giving convergence to the captured image having no convergence, a process of extracting a specific range from the captured image is performed. This extraction process can provide an image in which the two optical axes of the image capturing system virtually intersect at an object, so the user can feel as if he or she were observing an external world with convergence. The HMD provides the user with a composite image obtained by superposing a CG image on a captured image extracted to have convergence. The HMD measures the position and posture of the main body, superposes a generated CG image on a captured image in accordance with the measured position and posture, and displays the composite image, thereby displaying the captured image of the real world and the CG image of a virtual world in a correct positional relationship. To display the captured image and CG image in the correct positional relationship, it is necessary to measure the camera parameters such as the relative positions, focal lengths, principal point positions, and distortions of the cameras of the image capturing system. In the image capturing system of the HMD, the positional relationship between the two cameras is fixed in order to fix the camera parameters. The HMD displays a natural image for the user by matching the optical axis of the display system with the optical axes of the two cameras of the image capturing system.

The pupil distances of humans have individual differences (in other words, humans do not all have the same distance between their pupils). Therefore, to reduce the influence of the individual difference of the HMD user on the impression of use, there is a method of adjusting the pupil distance of the HMD. When this pupil distance adjustment is performed, the image capturing system and display system can be arranged in positions matching the pupil distance of the user. This makes it possible to provide the HMD for more users.

Japanese Patent Laid-Open No. 2005-311754 has disclosed a method of matching the image capturing system and display system with the pupil distance of the user by simultaneously moving the two systems.

In Japanese Patent Laid-Open No. 2005-311754, however, the camera parameters such as the relative positional relationship between the right and left cameras change because the image capturing system moves simultaneously with the display system. This change in camera parameters caused by the movement of the image capturing system sometimes makes it impossible to correctly superpose a CG image on a captured image.

Also, convergence has individual differences because the pupil distances of the users are different. In Japanese Patent Laid-Open No. 2005-311754, the extraction range is not changed in accordance with the individual difference of convergence, so as to give convergence to a captured image. This sometimes makes it impossible to provide a captured image having convergence matching the user.

SUMMARY OF THE INVENTION

The present invention has been made in consideration of the above problems, and provides a technique capable of displaying a captured image having convergence matching the pupil distance of the user by performing pupil distance adjustment without changing camera parameters.

According to one aspect of the present invention, there is provided an information processing apparatus comprising a first display unit and a second display unit for respectively displaying a first composite image and a second composite image for the two eyes of a user, comprising: a moving unit configured to move positions of the first display unit and the second display unit; a detecting unit configured to detect moving amounts of the first display unit and the second display unit; a first image capturing unit and a second image capturing unit configured to respectively obtain a first captured image and a second captured image; an extracting unit configured to generate a first extracted image and a second extracted image by respectively extracting portions of the first captured image and the second captured image in extraction ranges associated with the moving amounts; and a composite image generating unit configured to generate the first composite image and the second composite image by respectively compositing a first CG image and a second CG image with the first extracted image and the second extracted image.

Further features of the present invention will be apparent from the following description of exemplary embodiments with reference to the attached drawings.

BRIEF DESCRIPTION OF THE DRAWINGS

FIG. 2 is a front view of an image display unit when the user is observed from the object side of image capturing systems.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
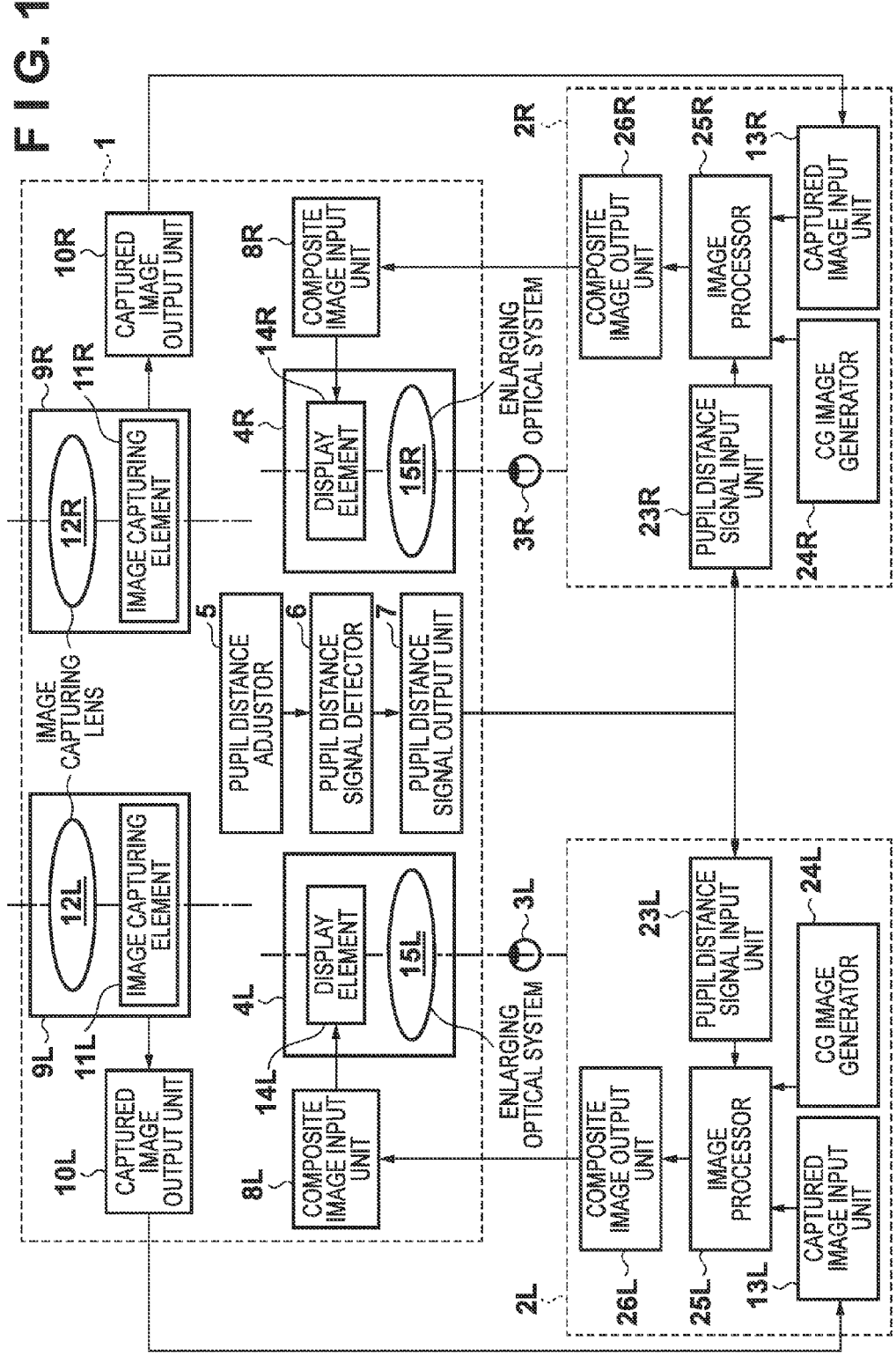
FIG. 1 is a view showing an example of the arrangement of an information processing apparatus.

First, the overall arrangement of an information processing apparatus according to this embodiment will be explained below with reference to FIG. 1. This information processing apparatus includes an image display unit 1, and image signal output units 2R and 2L for outputting image signals to the image display unit 1.

The image display unit 1 includes display systems 4R and 4L (first and second display units), a pupil distance adjuster 5, a pupil distance signal detector 6, a pupil distance signal output unit 7, composite image input units 8R and 8L, image capturing systems 9R and 9L (first and second image capturing units), and captured image output units 10R and 10L.

The display systems 4R and 4L respectively include display elements 14R and 14L and enlarging optical systems 15R and 15L, and display images for the two eyes (a right eye 3R and left eye 3L) of the user. Each of the display elements 14R and 14L is a liquid crystal display or organic electroluminescent (EL) display. The enlarging optical systems 15R and 15L enlarge images displayed on the display elements 14R and 14L. The images enlarged by the enlarging optical systems 15R and 15L are projected onto the right eye 3R and left eye 3L of the user. The pupil distance adjustor 5 can adjust the positions of the display systems 4R and 4L in accordance with the pupil distance of the user.

The image capturing systems 9R and 9L respectively include image capturing elements 11R and 11L such as CCD sensors, and image capturing lenses 12R and 12L.

The image signal output units 2R and 2L respectively include captured image input units 13R and 13L, pupil distance signal input units 23R and 23L, CG image generators 24R and 24L, image processors 25R and 25L, and composite image output units 26R and 26L.

The image capturing lenses 12R and 12L respectively form optical images of external images of the real world on the image capturing surfaces of the image capturing elements 11R and 11L. These optical images are converted into electrical signals through photoelectric conversion by the image capturing elements 11R and 11L, and the electrical signals are output as first and second captured images. The output signals from the image capturing elements 11R and 11L are respectively input to the captured image input units 13R and 13L of the image signal output units 2R and 2L via the captured image output units 10R and 10L.

The pupil distance signal detector 6 detects a pupil distance signal from the position information of the display elements 14R and 14L adjusted by the pupil distance adjustor 5. The pupil distance signal output unit 7 outputs the pupil distance signal detected by the pupil distance signal detector 6 to the pupil distance signal input units 23R and 23L.

The image processors 25R and 25L have a function of performing a process of extracting specific ranges of the first and second captured images obtained by the captured image input units 13R and 13L, and changing the extraction ranges based on the pupil distance signal (pupil distance data) obtained by the pupil distance signal input units 23R and 23L. That is, the image processors 25R and 25L generate first and second composite images by executing the image processing based on the CG images generated by the CG image generators 24R and 24L, the first and second captured images obtained by the captured image input units 13R and 13L, and the pupil distance signal (pupil distance data) obtained by the pupil distance signal input units 23R and 23L. The composite image output units 26R and 26L output the composite images generated by the image processors 25R and 25L to the composite image input units 8R and 8L. The composite images obtained by the composite image input units 8R and 8L are displayed on the display elements 14R and 14L. The enlarging optical systems 15R and 15L enlarge the images displayed on the display elements 14R and 14L, and project the enlarged images onto the right eye 3R and left eye 3L of the user.

Next, a front view of the image display unit 1 when the user is observed from the object side of the image capturing systems will be explained with reference to FIG. 2.

The image capturing systems 9R and 9L of the image display unit 1 are integrally fixed by a fixing unit 16. The fixing unit 16 is formed independently of the display systems 4R and 4L. The image display unit 1 includes a feed screw 17 (a screw mechanism) and two guide bars 18 and 19 (guide members) as a moving mechanism of the display systems 4R and 4L.

Threaded portions 20R and 20L are formed on those portions of the feed screw 17, which are threadably engaged with (fitted by a screw action in) the display systems 4R and 4L. The screw portions 20R and 20L are formed in opposite directions, and have a reverse screw relationship. Also, a manual adjustment means, e.g. an adjusting knob 21, is connected to the feed screw 17. When the user rotates the adjusting knob 21, the display systems 4R and 4L can move nearer to or away from each other as indicated by arrows B and C through the screw mechanism along the guide bars 18 and 19.

The two guide bars 18 and 19 prevent the display systems 4R and 4L from rotating relative to each other, and allow them to accurately move in the directions of the arrows B and C. This moving mechanism enables the user to adjust the display systems 4L and 4R by moving them to positions facilitating easy observation (of) the user.

Furthermore, the feed screw 17 includes the pupil distance (signal) detector 6. The pupil distance detector 6 includes a rotary encoder 22. The rotary encoder 22 detects the rotational angle of the feed screw 17, and outputs the detection result to the pupil distance signal output unit 7.

The pupil distance signal output unit 7 has a memory. A data table indicating the relationship between the rotational angle of the feed screw 17 and the pupil distance is stored in the memory. The pupil distance signal output unit 7 reads out, from the data table in the memory, pupil distance data corresponding to the detection result from the rotary encoder 22, and outputs the pupil distance data to the pupil distance signal input units 23R and 23L.

Figure 3:
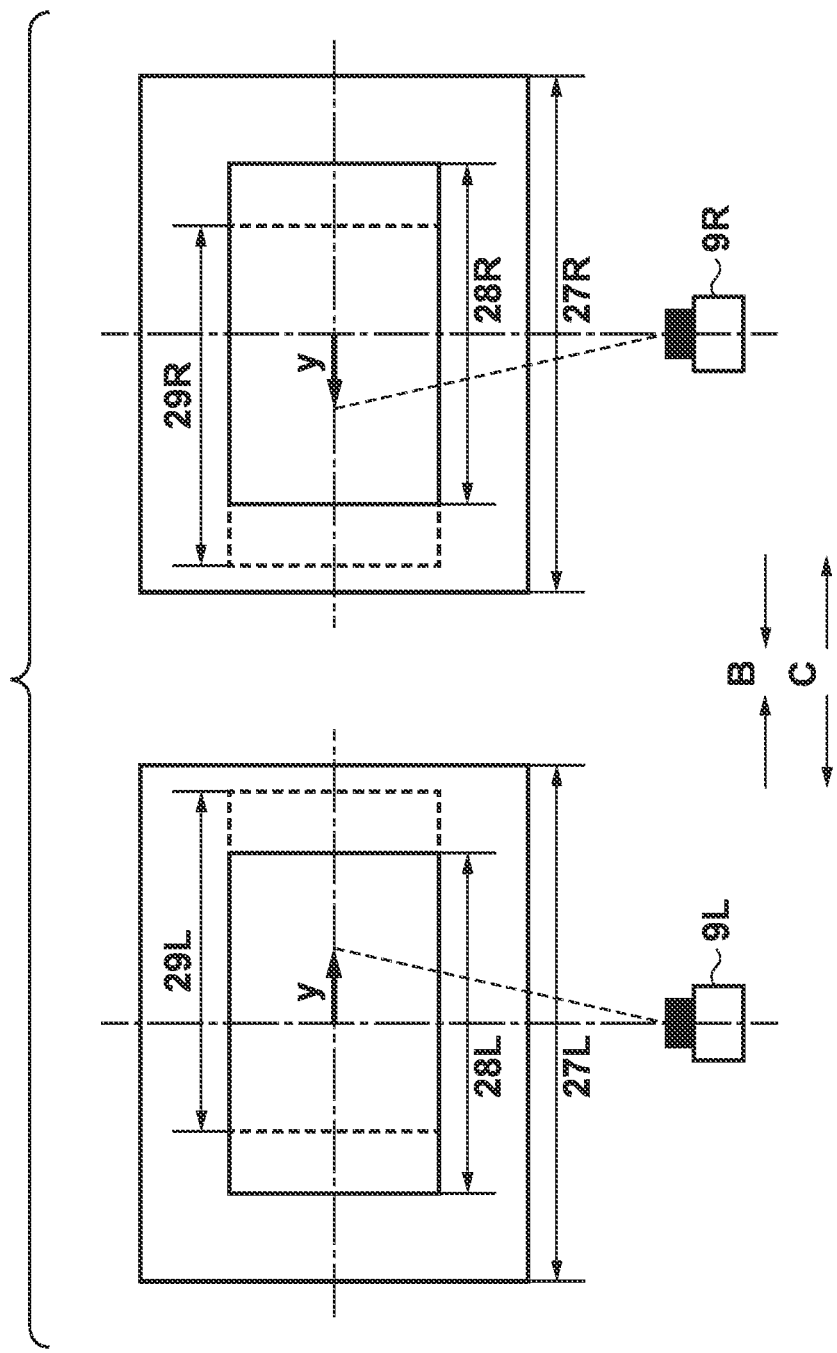
FIG. 3 is a model view for explaining the extraction ranges of captured images.

The ranges of captured image extraction executed by the image processors 25R and 25L by using the pupil distance data obtained by the pupil distance signal input units 23R and 23L will be explained below with reference to FIG. 3.

First, the optical axes of the image capturing systems 9R and 9L are almost parallel. Captured images 27R and 27L indicate images captured by the image capturing systems 9R and 9L having almost parallel optical axes. First and second extracted images 28R and 28L indicate captured images formed by extracting partial ranges of the first and second captured images 27R and 27L. First and second captured images 29R and 29L indicate captured images formed by changing the extraction ranges from those of the extracted images 28R and 28L, so that the optical axes of the image capturing systems virtually have specific convergence.

The extraction ranges of the extracted images 29R and 29L having convergence are determined based on the pupil distance data obtained by the pupil distance signal input units 23R and 23L. This makes it possible to provide captured images having convergence matching the user.

Assume that the extraction ranges of the extracted images 29R and 29L having convergence are changed to positions where the optical axes of the image capturing systems 9R and 9L intersect at points moved by y pixels in the directions of the arrows B. A moving amount y of the extraction range is represented by $$y = \frac{\left(\frac{D+X}{2}\right)A}{2L\tan\left(\frac{\omega}{2}\right)} \quad (1)$$

where y: the moving amount (pixels) of the extraction range, D: the pupil distance (mm) of the image capturing systems, X: the moving amount (mm) of the display system, A: the number of horizontal pixels (pixels) of the image capturing system, L: a distance (mm) to the convergence point of the image capturing system, and w: the angle of view (degrees) of the image capturing system.

Note that the moving amount X of the display system takes a negative value when the display system is moved in the directions of the arrows B, and a positive value when the display system is moved in the directions of the arrows C.

By changing the extraction ranges in accordance with equation (1), it is possible to give captured images convergence matching the pupil distance of the display systems, and provide a natural comfortable image for the user.

The CG image generators 24R and 24L generate first and second CG images having a parallax, based on the position-posture information of the image display unit 1. The image processors 25R and 25L superpose the first and second CG images generated by the CG image generators 24R and 24L on the captured images extracted in accordance with equation (1), thereby executing a composite image generating process.

As described above, it is possible to correctly superpose CG images on captured images by fixing the camera parameters, and display captured images having convergence matching the pupil distance of the user.

Note that the method of performing pupil distance adjustment to positions appropriate for the user depends on the user's judgment in this embodiment, but it is also possible to capture images of the pupils of the user, measure the pupil distance of the user from the captured pupil images, and perform pupil distance adjustment to appropriate positions.

Note also that the image capturing systems are fixed in order to fix the camera parameters, and the feed screw having the right and left reverse screws is used as the mechanism for moving the display systems. However, another mechanism may also be used as long as the positions of the display systems can be matched with the pupil distance of the user.

In this embodiment as has been explained above, pupil distance adjustment is performed on the display systems while the image capturing systems of the image display unit are fixed. To reduce the uncomfortable feeling of the user resulting from the fixation of the image capturing systems, the extraction ranges of the captured images are changed to ranges associated with the moving amounts of the display systems.

In this embodiment, the distance between the image capturing systems is fixed, and the distance between the display systems is adjusted by moving only the display systems. Consequently, pupil distance adjustment can be performed while the camera parameters are fixed, that is, without changing them. Also, captured images having convergence matching the user can be displayed by changing the extraction ranges of the captured images in accordance with the moving amounts of the display systems. This makes it possible to provide a natural image for the user.

In the present invention, it is possible to perform pupil distance adjustment without changing the camera parameters, and display captured images having convergence matching the pupil distance of the user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-282264 filed on Dec. 22 2011, which is hereby incorporated by reference herein in its entirety.

What is claimed is:

1. An information processing apparatus comprising:
a moving unit configured to move relative positions of a first display unit and a second display unit, wherein said first display unit and said second display unit display images for respective eyes of a user;
a detecting unit configured to detect relative moving amounts of said first display unit relative to said second display unit and said second display unit relative to said first display unit;
an obtaining unit configured to obtain a first captured image captured by a first capturing unit and a second captured image captured by a second captured unit, respectively;
a determination unit configured to determine extraction ranges based on the relative moving amounts of said first display unit relative to said second display unit and said second display unit relative to said first display unit detected by the detecting unit, wherein moving amounts of the extraction ranges are calculated to be proportional to both the relative moving amounts of said first and second display units and a pupil distance of said first capturing unit and said second capturing unit;

an extracting unit configured to generate a first extracted image and a second extracted image by respectively extracting portions of the first captured image and the second captured image in the extraction ranges determined by the determination unit; and a composite image generating unit configured to generate a first composite image and a second composite image by respectively compositing a first CG image and a second CG image with the first extracted image and the second extracted image.

2. The apparatus according to claim 1, wherein said moving unit comprises:
at least two guide members;
a screw mechanism formed along one of said guide members; and
a rotatable manual adjustment unit connected to said screw mechanism,
wherein said screw mechanism moves the positions of said first display unit and said second display unit along said guide members, in accordance with the rotation of said rotatable manual adjustment unit.

3. The apparatus according to claim 2, wherein portions of said screw mechanism, which correspond to said first display unit and said second display unit, are threaded in opposite directions, and
said moving unit moves said first display unit and said second display unit away from or nearer to each other.

4. The apparatus according to claim 1, further comprising said first display unit and said second display unit.

5. The apparatus according to claim 1, further comprising said first capturing unit and said second capturing unit.

6. The apparatus according to claim 1, wherein said moving unit moves said first display unit and said second display unit in different directions for each other.

7. The apparatus according to claim 1, wherein the moving amounts are caused by the moving unit moving positions of said first display unit and said second display unit.

8. The apparatus according to claim 1, wherein a distance between said first capturing unit and said second capturing unit is fixed.

9. The apparatus according to claim 1, wherein positions of said first capturing unit and said second capturing unit are fixed.

10. The apparatus according to claim 1, wherein said moving amounts of the extraction ranges are determined by the equation:

$$y = \frac{\left(\frac{D+X}{2}\right)A}{2L\tan\left(\frac{\omega}{2}\right)}$$

where y represents said moving amounts of the extraction ranges, D represents the pupil distance between the first capturing unit and the second capturing unit, X represents the relative moving amounts of said first and second display units, A represents the number of horizontal pixels of the first capturing unit and the second capturing unit, L represents a distance to the convergence point of the first capturing unit and the second capturing unit, and $\omega$ represents the angle of view of the first capturing unit and the second capturing unit.

11. An information processing apparatus comprising:
a moving unit configured to move relative positions of a first display unit and a second display unit, wherein said first display unit and said second display unit display images for respective eyes of a user;
a detecting unit configured to detect relative moving amounts of said first display unit relative to said second display unit and said second display unit relative to said first display unit;
a first capturing unit and a second capturing unit configured to capture a first captured image and a second captured image, respectively;
a determination unit configured to determine extraction ranges based on the relative moving amounts of the first display unit relative to said second display unit and the second display unit relative to said first display unit detected by the detecting unit, wherein moving amounts of the extraction ranges are calculated to be proportional to both the relative moving amounts of said first and second display units and a pupil distance of said first capturing unit and said second capturing unit;
an extracting unit configured to generate a first extracted image and a second extracted image by extracting portions of the first captured image and the second captured image, respectively, in the extraction ranges determined by the determination unit; and
a composite image generating unit configured to generate a first composite image and a second composite image by compositing a first CG image and a second CG image, respectively, with the first extracted image and the second extracted image,
wherein said first display unit and said second display unit configured to display the first composite image and the second composite image, respectively.

12. The apparatus according to claim 11, wherein the moving amounts are caused by the moving unit for moving positions of said first display unit and said second display unit.

13. The apparatus according to claim 11, wherein a distance between said first capturing unit and said second capturing unit is fixed.

14. The apparatus according to claim 11, wherein positions of said first capturing unit and said second capturing unit are fixed.

15. An information processing method comprising:
moving relative positions of a first display unit and a second display unit, wherein the first display unit and the second display unit display images for respective eyes of a user;
detecting relative moving amounts of the first display unit relative to the second display unit and the second display unit relative to the first display unit;
obtaining a first captured image captured by a first capturing unit and a second captured image captured by a second captured unit;
determining extraction ranges based on the relative moving amounts of the first display unit relative to the second display unit and the second display unit relative to the first display unit detected in the detecting step, wherein moving amounts of the extraction ranges are calculated to be proportional to both the relative moving amounts of the first and second display units and a pupil distance of the first capturing unit and the second capturing unit;

an extracting unit configured to generate a first extracted image and a second extracted image by respectively extracting portions of the first captured image and the second captured image in the extraction ranges determined in the determining step; and generating a first composite image and a second composite image by respectively compositing a first CG image and a second CG image with the first extracted image and the second extracted image.

16. A non-transitory computer-readable storage medium storing a program for causing a computer to execute an information processing method comprising:

moving relative positions of a first display unit and a second display unit, wherein the first display unit and the second display unit display images for respective eyes of a user;

detecting relative moving amounts of the first display unit relative to the second display unit and the second display unit relative to the first display unit;

obtaining a first captured image captured by a first capturing unit and a second captured image captured by a second captured unit;

determining extraction ranges based on the relative moving amounts of the first display unit relative to the second display unit and the second display unit relative to the first display unit detected in the detecting step, wherein moving amounts of the extraction ranges are calculated to be proportional to both the relative moving amounts of the first and second display units and a pupil distance of the first capturing unit and the second capturing unit;

an extracting unit configured to generate a first extracted image and a second extracted image by respectively extracting portions of the first captured image and the second captured image in the extraction ranges determined in the determining step; and generating a first composite image and a second composite image by respectively compositing a first CG image and a second CG image with the first extracted image and the second extracted image.

17. An information processing method comprising:

moving relative positions of a first display unit and a second display unit, wherein the first display unit and the second display unit display images for respective eyes of a user;

detecting relative moving amounts of the first display unit relative to the second display unit and the second display unit relative to the first display unit;

capturing, with a first capturing unit and a second capturing unit, a first captured image and a second captured image, respectively;

determining extraction ranges based on the relative moving amounts of the first display unit relative to the second display unit and the second display unit relative to the first display unit detected in the detecting step, wherein moving amounts of the extraction ranges are calculated to be proportional to both the relative moving amounts of the first and second display units and a pupil distance of the first capturing unit and the second capturing unit;

generating first extracted image and a second extracted image by extracting portions of the first captured image and the second captured image, respectively, in the extraction ranges determined in the determining step; and generating a first composite image and a second composite image by compositing a first CG image and a second CG image, respectively, with the first extracted image and the second extracted image, displaying, on the first display unit and the second display unit, the first composite image and the second composite image, respectively.

18. A non-transitory computer-readable storage medium storing a program for causing a computer to execute an information processing method comprising:

moving relative positions of a first display unit and a second display unit, wherein the first display unit and the second display unit display images for respective eyes of a user;

detecting relative moving amounts of the first display unit relative to the second display unit and the second display unit relative to the first display unit;

capturing, with a first capturing unit and a second capturing unit, a first captured image and a second captured image, respectively;

determining extraction ranges based on the relative moving amounts of the first display unit relative to the second display unit and the second display unit relative to the first display unit detected in the detecting step, wherein moving amounts of the extraction ranges are calculated to be proportional to both the relative moving amounts of the first and second display units and a pupil distance of the first capturing unit and the second capturing unit;

generating first extracted image and a second extracted image by extracting portions of the first captured image and the second captured image, respectively, in the extraction ranges determined in the determining step; and generating a first composite image and a second composite image by compositing a first CG image and a second CG image, respectively, with the first extracted image and the second extracted image, displaying, on the first display unit and the second display unit, the first composite image and the second composite image, respectively.

* * * * *